Jan. 19, 1937.  P. OKEY  2,068,565

SCALE

Filed March 28, 1934  4 Sheets-Sheet 1

INVENTOR.
PERRY OKEY
BY
*W.S. Babcock*
ATTORNEY.

Jan. 19, 1937.　　　　　P. OKEY　　　　　2,068,565
SCALE
Filed March 28, 1934　　　　4 Sheets-Sheet 2

INVENTOR.
PERRY OKEY
BY
W. F. Babcock
ATTORNEY.

Jan. 19, 1937.    P. OKEY    2,068,565
SCALE
Filed March 28, 1934    4 Sheets-Sheet 3

INVENTOR.
PERRY OKEY
BY
W. S. Babcock
ATTORNEY.

Jan. 19, 1937.    P. OKEY    2,068,565
SCALE
Filed March 28, 1934    4 Sheets-Sheet 4

INVENTOR.
PERRY OKEY
BY
W. S. Babcock
ATTORNEY.

Patented Jan. 19, 1937

2,068,565

UNITED STATES PATENT OFFICE 2,068,565

SCALE

Perry Okey, Columbus, Ohio, assignor to Exact Weight Scale Company, Columbus, Ohio, a corporation of Ohio Application March 28, 1934, Serial No. 717,768

8 Claims. (Cl. 265—56)

The invention to be hereinafter described relates to scales.

The scale beam, as is well known, gravitates about its knife-edge pivotal mountings to a balanced position. When an article is placed on one platter to be weighed and the corresponding weight is placed on the other platter, or corresponding weight support, due to the free swinging knife-edge pivotal support, the beam oscillates about the pivot before it finally comes to rest. Similarly, in all cases in which a poise is moved lengthwise, relatively to the beam, there is the same oscillation. In all cases in which a poise is traversed automatically by power, it always over-runs, as will be readily understood. It must then be traversed reversely, and again over-runs. Throughout this reciprocation the beam oscillates. Many and varied attempts have been made to eliminate or, at least, minimize such oscillation. Where a traversible poise is used, automatically reversing the motor as the poise over-runs, has been repeatedly tried. But the poise still makes repeated over-runs and the beam still correspondingly oscillates, because it is impossible to reverse until some over run has been made.

The present invention attacks the problem from an entirely different angle than heretofore known, as far as I am aware. Instead of permitting oscillation and attempting to cure the results, the present invention, among other objects, aims to prevent or avoid oscillations. It seeks to prevent the origin or beginning of oscillations. It is a preventative where existing devices and methods have been attempts at cures.

In a general and broad sense, the invention comprises the temporary application of an additional force to that of the weight of the movable poise, during the movement of the poise to approximate the point at which the poise, alone, would effect balance; discontinuance of such force at that point; and decreasing the speed of movement, relatively, of the poise from that point to the point of balance. This method, comprising temporarily increasing the weight effect of the poise, and then removing that supplemental force so that the effect of the poise, alone, comes into play, at a predetermined stage, should be automatically controlled. In fact, other than automatic control is probably impossible. It is, obviously, impractical.

While a certain definite mechanical construction has been more or less disclosed in several of the figures of the drawings, particularly, Figs. 1, 2, 3 and 9 it is understood that the invention is thoroughly applicable to a very wide range of scales and weighing machines, both, differing widely from, and resembling, closely, such illustrated structure.

In order to more clearly disclose the operation and use of the invention reference should be had to the accompanying drawings diagrammatically illustrating the same and forming part of this application.

Throughout the several views of the drawings, like reference characters designate the same parts.

Figures 8, 9:
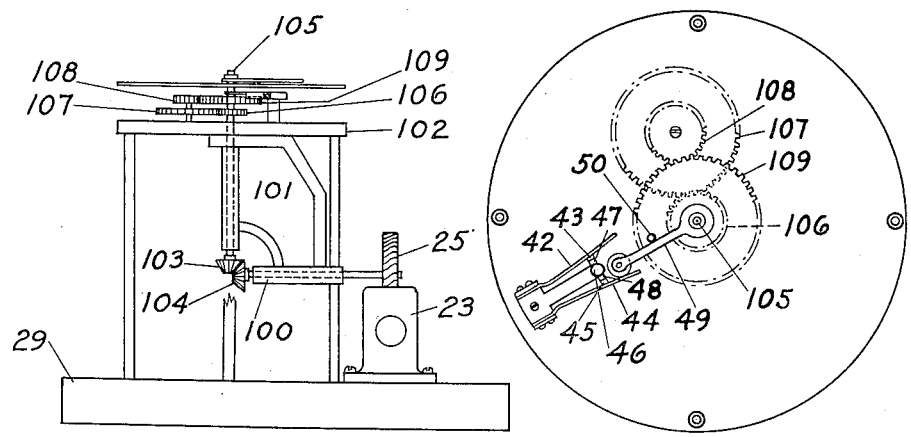

Figs. 3 to 7, inclusive, are diagrammatic views showing various steps of the operation of the invention;

Fig. 8 is a top plan view of the clock-train of gears for the indicator, showing automatic overrun circuit breaker; and Fig. 9 is an end view, in place, showing the driving connections between the motor shaft and indicator.

As one of the many adaptations, the invention is herein disclosed as applied to a well known type of travelling poise scale.

For purposes of illustration, a suitable scale beam 1, in the general form of an open rectangle is mounted in usual and well known manner on knife-edge pivots 2 at the approximate longitudinal centre, the pivots being carried by the beam and seated in blocks on the base or other suitable support 29. The beam carries, in well known manner, the usual knife-edge pivots 3 for the usual platter 28 (not shown in Fig. 1). Beam 1 is provided with a pair of rails 4—4' on which is mounted, in a freely reciprocable manner, the poise 5 which operates in well known manner. Suitable anti-friction rollers (not shown) carried by the poise, support its weight on the rails. The rails may be round to seat in concaved faces of the rollers or inverted V-shaped to fit into V-shaped roller faces, all as will be readily understood. These rails extend the full length of the beam and have their ends securely seated in the two cross bars or end members 10 and 11 of the beam. The poise 5 is adapted to be reciprocated along the rails 4—4' by a worm shaft 9 threaded through two nuts 7 and 8 on opposite sides of the arm 6, which arm extends from poise 5. The arm 6 is provided with an unthreaded opening to freely receive the worm shaft 9. Nuts 7 and 8 are threaded on shaft 9. They are yieldingly connected to arm 6 by bolts passed through the nuts and threaded into the arm 6. About each bolt is a coil spring 12, 13, respectively. These springs, confined between their respective bolt heads and plates 7 and 8, keep the plates hugged tight against the threads of the worm shaft 9 and completely take up or eliminate all looseness or back-lash. Springs 12 are stiffer than springs 13 and serve to hold nut 7 solidly against arm 6 of the poise. Springs 13 serve to eliminate back-lash between the nuts and the worm 9, because of the space between the face of the nut and the arm 6. The worm shaft is of course, journaled in the end members 10 and 11 of the beam. Worm shaft 9 carries a gear 14 which meshes with and is driven by a pinion 15 fixed to counter shaft 16 journaled in bearings 17 and 18 of a lateral extension of beam 1. It will be noticed that all parts for reciprocating poise 5 are carried in and rock with beam 1. To drive counter shaft 16, a motor 23 is provided. It is mounted, either direct on the base 29 or on any suitable support on the base. It is the power unit for the main or drive shaft 21, journaled in a suitable bearing 22 carried by base 29. Shaft 21 is provided with a conically cut gear 20 meshing with and driving a plain cylindrically cut, spur gear 19 on the counter shaft 16. Gear 20 has no movement, bodily, whereas gear 19 does move bodily. It moves relatively to gear 20. Gear 19 swings or rocks with the beam 1 and on the same arc as the beam. It rocks about the knife-edge 2 as a pivot. In assembling, gears 19 and 20 are so positioned that a plane passed horizontally through knife-edge pivots 2 will cut the pitch lines of both gears. When so mounted, there will be complete, continuous driving contact throughout, between the gears in any and all positions of the beam, with absolutely no binding effect between the gears, as the beam rocks. All other driving connections are carried by and move with the beam. Consequently, the sensitivity of the beam is absolutely unaffected in even the smallest way or degree by any of the operating parts. The mechanism so far described may readily reciprocate the poise 5 as desired, the motor, of course, being a reversible motor of well known type. It is mounted on the scale base as above stated and does not move with the beam as will be seen.

The weight of the article or material on the platter 28 corresponds to the position of the poise 5 longitudinally of the worm shaft 9, at the moment when the balance is effected, as well understood. To translate this into standard units, such as pounds and ounces, etc., as the case may be, suitably graduated dial 27 is used. A travelling pointer 26 fixed to and revoluble with a gear 109 which is driven by a worm 24, through a suitable train of gears, serves to indicate the weight, on the dial. As the poise 5 is moved along the rails 4—4' pointer 26 will be correspondingly carried about dial 27, all as hereinafter set forth in greater detail. While this is one construction and arrangement for reciprocating the poise and indicating the weight, it will be obvious that many other constructions and arrangements may be devised and used.

Figure 2:
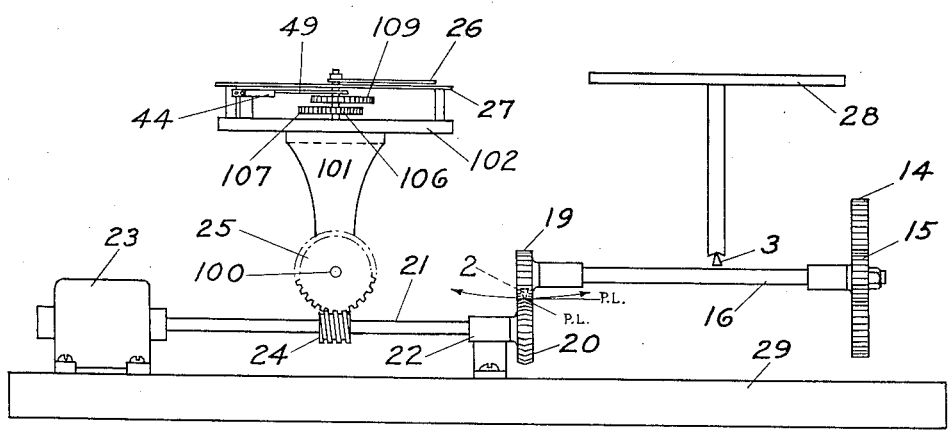
Fig. 2 is a side elevation of the drive transmission and indicating means, with weighing platter in diagram, the spherical curvature of the gears being greatly exaggerated.

A very important feature of the invention is the character and mounting of the gears 19 and 20. They are so positioned relatively to the pivotal mounting of the beam that the movable gear (on the beam) is in continuous contact with the stationary gear. Their respective contacting or engaging surfaces or teeth are so shaped or curved that there is absolutely free swinging, minimum friction and non-binding engagement between these gears at any and all varying positions of the beam. Yet this engagement is for the full normal working depth of the teeth. Briefly, there is a fixed or stationary power shaft and a counter-shaft having a swinging or pivotal movement relatively thereto, and the gears for transmitting power from one to the other are so proportioned, constructed and positioned, as to avoid all universal couplings or other special devices, and yet completely eliminate all detrimental effects between the gears due to the movement of the one shaft relatively to the other. Without some such provision, the sensitivity of the scale would be very seriously affected. With it, the motor or other power unit may be mounted on the base or other suitable support and does not have to move with the beam. In Fig. 2, considerably exaggerated for clearness, the above curvature is shown, the arc of rock of the beam being indicated by the arrowed segment of circle. The swing is concentric with the knife-edge beam pivot, the line of which, as shown, intersects the lines of pitch of the gear teeth.

In addition to unimpaired sensitivity, as above detailed, prime requisites sought by all scale builders are speed and accuracy.

There is a simple, efficient, automatically actuated electrical system for moving the poise and for temporarily increasing the effective weight thereof. The movement of the beam automatically controls the electrical system. To that end, the beam carries, at any suitable point, a post, bar or rod 35 which may be either removably or permanently secured to or formed on the beam. It should be of suitable insulation, or should be suitably insulated, to definitely prevent possible inclusion of the beam within the electrical system. In the arrangement illustrated, two metal conductors or plates 36 and 37 are to be carried by the post 35, by means of an intervening strip of insulation. In substance, conducting plates 36 and 37, with the intervening strip of insulation, may be considered as one composite plate having conducting sections 36 and 37, electrically insulated from each other by a non-conducting strip, through and by means of which the composite plate is secured to and carried by post 35.

It is to be clearly born in mind that the particular construction and arrangement shown is purely diagrammatic and that many other acceptable constructions and arrangements are equally included within this application.

As the beam 1 rocks, the various electrical circuits will be automatically made or broken, as the case may be, as will hereinafter appear. So, in substance, this construction and arrangement functions as an automatic switch. Through these circuits, the poise is moved and, as it moves, supplemental forces are brought to bear throughout portions of the travel of the poise, to temporarily add to or increase the effective weight of the poise, and the speed of travel of the poise, at a predetermined point, is greatly reduced.

Figure 3:
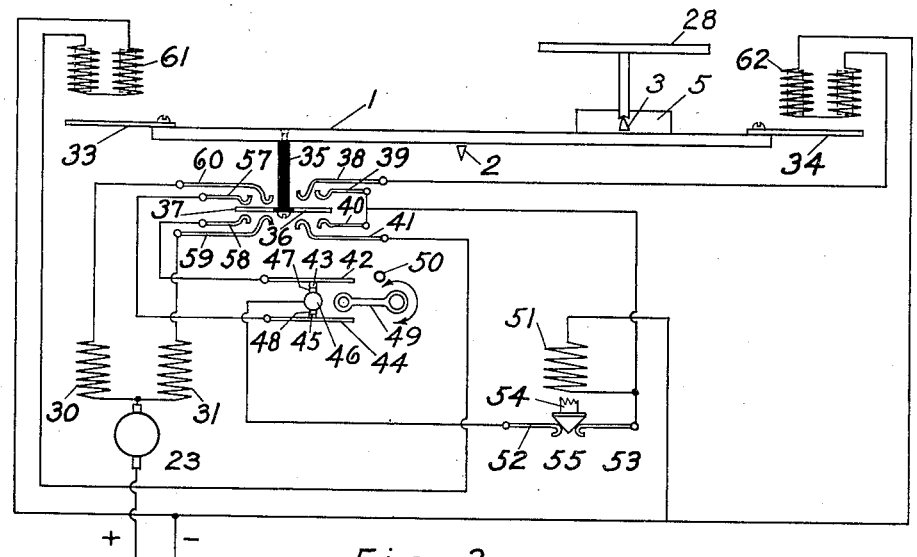
Figure 4:
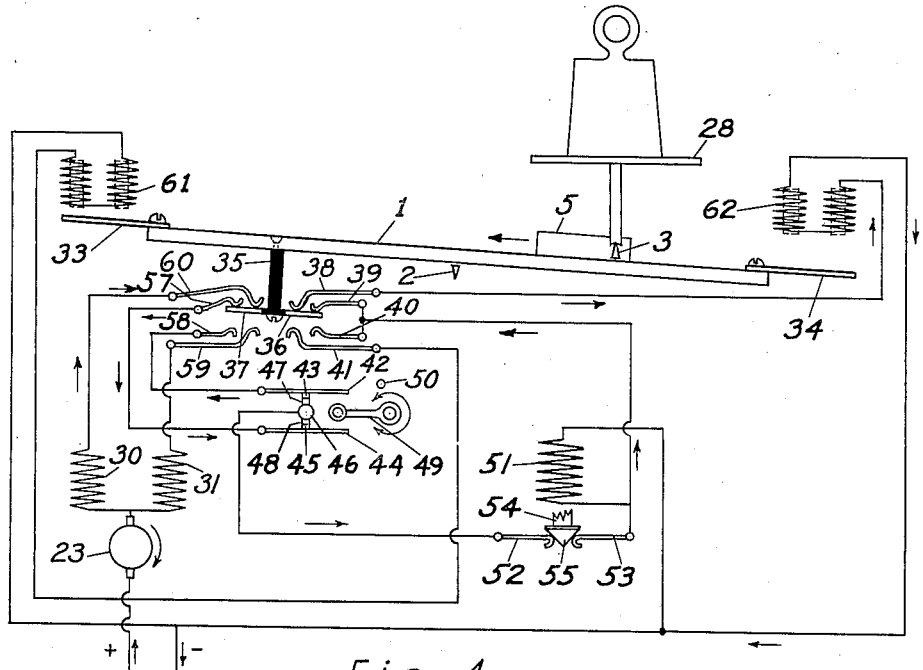
Figure 5:
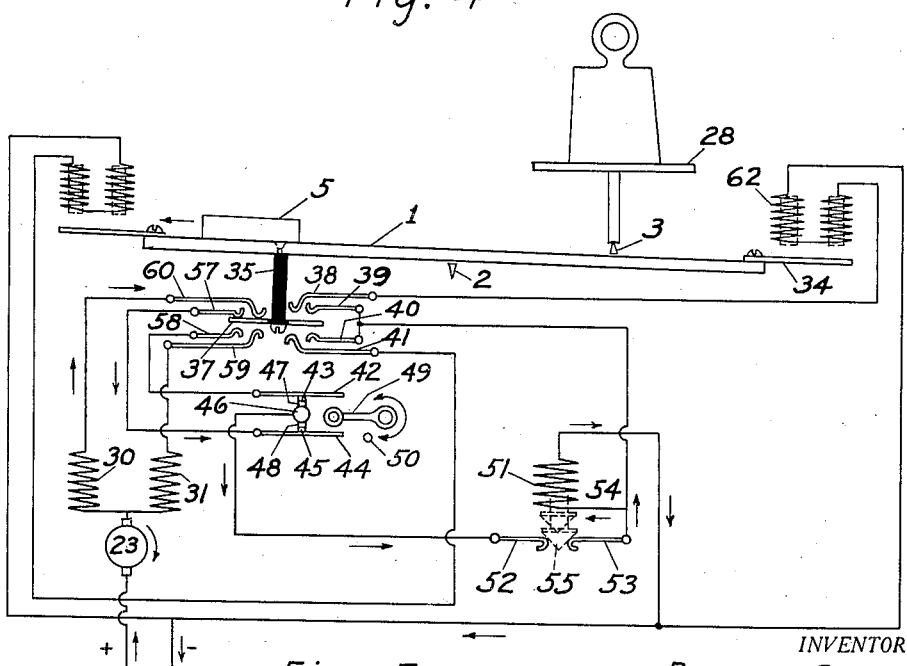
Figure 6:
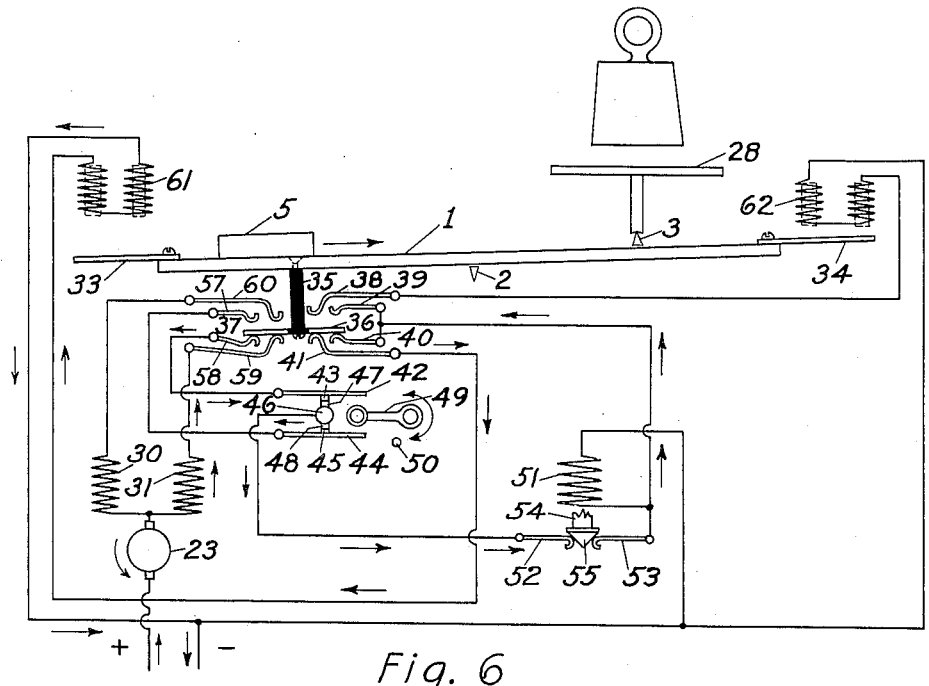
Figure 7:
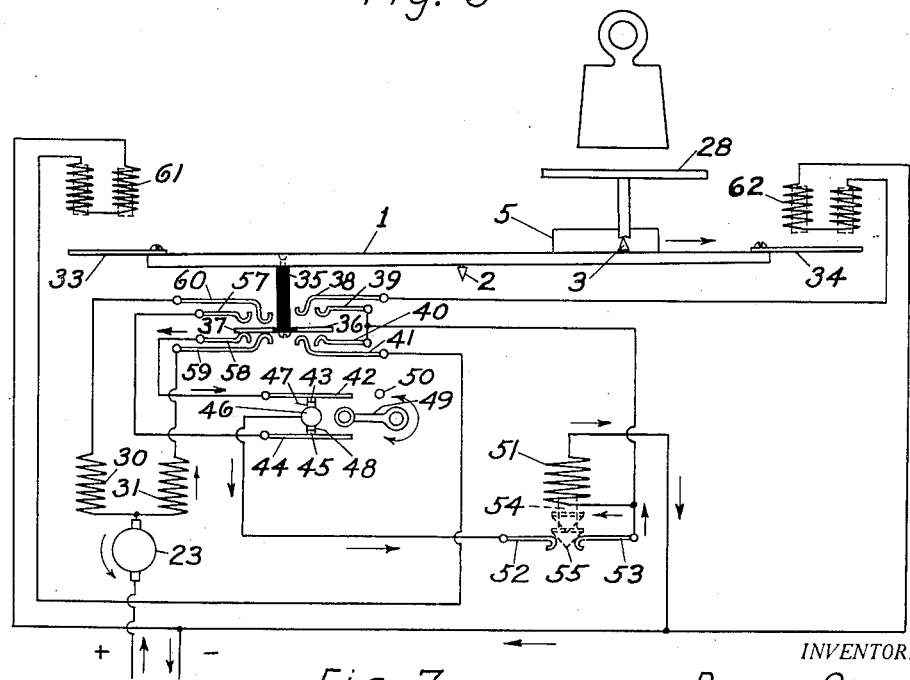

In order to more graphically present the various steps, and the electrical system for performing them, the group of diagrammatic Figures 3–7 has been prepared, each showing a separate step in the progress of the method. Briefly stated:—Figure 3 illustrates a balanced condition, with no weight on the scale (no weight on platter 28), and all circuits open or broken; Fig. 4 illustrates the starting point, with beam tipped at its platter end by a weight and the circuits closed to move the poise, at high speed, toward balancing position, while another circuit exerts a supplemental force to temporarily increase the effective weight of the poise; Fig. 5 illustrates the approach to balanced position, with the intermittent impulse circuit operating the motor very slowly; Fig. 6 illustrates the return starting point or position, with circuits closed to move the poise, at high speed, toward original balancing position, while another circuit exerts a supplemental force to temporarily increase the effective weight of the poise—Fig. 6 may be considered the reverse of Fig. 4; and Fig. 7 illustrates the approach to the balanced position (from Fig. 6) with the intermittent-impulse circuit operating the motor very slowly. The first travel of the poise, high speed travel, through most of its movement, gives the speed desired in weighing, while the slow travel in the last very small part of the total distance travelled, gives the opportunity for accuracy.

In order to disclose the invention, its successive steps, and the means for performing it, the above diagrammatic figures will be referred to more in detail. Start with the assumption that the beam is in the neutral or balanced position, as represented in Fig. 3. The poise 5 is then symmetrical with knife-edge pivot 3 of platter 28, all as shown. Poise 5 is shiftable back and forth by worm 9 which is driven, through suitable connections hereinbefore referred to, from the motor 23 which is a reversible, series-wound, split field type well known in the market. It has the usual line connections for flow of current through it from and to the usual source of power. This current flowing through the field coils 30 and 31, in one direction or the other, rotates the motor accordingly and moves the poise 5 toward one or the other end of the beam. The same current passes through a plurality of circuits and branch circuits all included within and as parts of the one electrical system which drives the motor. These circuits and branch circuits actuate and control the scale and carry out the method of this invention.

Starting now, from the position of Fig. 3, as above, assume that a weight of 10 pounds, or other permissible amount within the capacity of the scale has been put on platter 28. That immediately depresses the platter end of the beam and correspondingly raises the opposite end, while at the same time maintaining complete, free, intermeshed, driving connections with minimum friction between gears 19 and 20 for driving worm 9 from motor 23. This position is shown in Fig. 4. As the beam end rises, plate 37 will engage spring contacts 57 and 59 so that a current may flow from one to the other through the plate, and plate 36 will similarly engage spring contacts 38 and 39, so that current may similarly flow from one to the other of said contacts through said plate. With the parts in the positions of Fig. 4 current will flow in the direction of the arrows. Entering motor 23 and flowing through field 30, it will pass through contact 60, plate 37, contact 57, through spring contacts 44—45, through contact 48 of post 46, through the wire to spring contact 52 and through the electro-magnetically operated cone contact 55 to spring contact 53, thence through the wire to spring contact 39, a small part of the current flowing through the coil 51, but not enough to actuate contact 55. From contact 39, the current continues through plate 36, contact 38, the wire leading therefrom to and through the electro-magnet coil 62 and from that coil back to the line wire of the power circuit, all as thoroughly indicated by the direction arrows. With the parts in this position, only a small part of the current flows through the coil 51, the resistance of this coil to current then passing therethrough being such that the resulting torque is insufficient to raise the core 54 carrying the cone contact 55. Consequently, in that position of the parts, the contact 55 remains in full line position or closed. The motor has started and is running at high speed or full speed, moving the poise 5 in the direction of the arrows. At the same time and continuing during such travel of the poise, coils 62 act magnetically on the armature 34 carried by beam 1. Obviously, such armature may be an integral part of the beam. The action is an upward pull or lift. Assume that there were no such upward pull or lift on the beam. The poise 5 would continue in the direction indicated until it balanced the weight on the platter 28. Then, theoretically, the beam would tip back to the balanced position of Fig. 3. But that theory is not possible of attainment. Due to inertia, the poise 5 will invariably, overrun. Then it must be run back. It will again over-run in the opposite direction, etc. You would have, again, the old objection of beam oscillation. But, by the present method, the poise is not allowed to reach such balancing position at high or full speed. The supplementary force of magnet 62 causes poise 5 to start the beam toward balanced position sooner than would the weight of poise 5, alone. It is as though poise 5 were made heavier to that extent. Obviously such heavier weight would balance the weight on the platter 28 sooner than would the normal or unassisted poise 5. Therefore, beam 1 will tip toward balanced position (Fig. 3) before poise 5 actually reaches the position at which it would tip the beam, were it acting alone and unassisted. It will still have to travel from that point to the point at which it, alone, would balance the weight on the platter 28. Now, as beam 1, affected by the weight of poise 5 plus the upward force of electro-magnet 62, tips from the position of Fig. 4 toward the balanced position of Fig. 3, it will first reach the position of Fig. 5, the poise 5 closely approaching the balanced position—i. e. with only a very short distance still to go. Here, the beam has just started to tip toward balanced position. The first downward movement of the end carrying the contact plates 36—37, moves the plate 36 from spring contacts 38—39, breaking the electro-magnet circuits through coils 62 and deenergizing the magnets. The upward force of the magnets, as designed, is slight. So, the poise 5 will have been traversed very nearly to the position where it, alone, would have balanced the load at the instant that the magnet is automatically deenergized and the assisting force discontinued. This slight beam movement, however, does not break the circuit through coil 51 of the core 54 of contact 55. Instead, the full flow of current, including that previously directed through the magnet 62 to energize it, will now pass through coil 51, as clearly shown by the direction arrows in Fig. 5. The current will flow as follows:—From motor winding 30 to contact 60, plate 37, contact 57, spring contact 44, contact 45, contact 48, post 46, contact 52, cone 55, contact 53, coil 51, and out to the return side of the power line. Whereas, the partial current through the coil 51, while magnet 62 was in the same circuit and utilizing part of the current, was not sufficient to raise the core and cone 55, the full current now passing through coil 51 is ample to and does raise the cone contact 55. This instantly breaks all circuits and stops the motor 23. Coil 51 is then instantly deenergized. Cone 55 drops and instantly reestablishes the circuits and restarts the motor. As it restarts, poise 5 moves very slightly toward final balance, again. Instantly, the full current again raises cone contact 55 and stops the motor. This is very rapidly repeated. This trembling, vibrating, or interrupted movement results in a multiplicity of very rapid make-and-break contacts, with corresponding electrical impulses through the motor. The result is that the motor makes a number of very short partial rotations in the same direction—toward balance. They are so rapid and so short and so close together as to time, as to seem a continuous rotation at extremely slow speed. The actual practical net result is a relatively slow speed approach of the poise from where the cooperating electro-magnet force was discontinued to the point of balance. It may over-run to an extremely small extent—one or two impulses. In that case, the beam will tilt to the position of Fig. 7, but with the poise and platter weight in the position of Fig. 5. This will simply reverse the motor, but at the same slow impulse speed. The current will then flow through field 31 (reversing the motor) contact 59, plate 37, contact 58, spring contact 42, contact 43, contact 47, post 46, contact 52, cone 55, contact 53, coil 51, and out to the return line. The motor operation will be as above explained only in the reverse direction. The over-run, if any, will be so slight that only a very few impulses will be necessary to bring the poise to the exact balance position of Fig. 3. This slow approach in the last very short portion of the travel of the poise, and up to the final exact balance, gives the desired accuracy and completely eliminates oscillations.

After the article or commodity has been weighed, it will, of course, be removed from the platter 28. Instantly, the poise 5 depresses that end of beam 1—see Fig. 6. This brings plate 37 into operative engagement with contacts 58 and 59 and plate 36 into operative engagement with contacts 40 and 41. This closes the motor circuit and starts the electrical system, but in the opposite or reverse direction to that described in detail in relation to Fig. 4, above, and at high speed. With the parts in the positions of Fig. 6, current will flow through field winding 31, through contact 59, plate 37, contact 58, successively through contacts 42, 43, 47, through post 46, through contacts 52, 55 and 53 (partly) through coil 51, through contact 40, plate 36, contact 41, through electro-magnet coil 61 and thence to the return line or power wire. This will start the high speed return travel of the poise toward the position of Fig. 3—balanced position with no weight of platter 28. This operation is substantially the same as that described in relation to with reference to Fig. 4 and, therefore, need not be repeated here in detail. In this case, of course, an armature 33 similar to armature 34, is acted upon by the magnet of coil 61, as will be readily understood. Fig. 4, represents, diagrammatically, the method and operation of balancing a weight on platter 28 by movement of poise 5. Fig. 6 represents, similarly, the method and operation of balancing the beam and platter (without weight) by return movement of poise 5. Electromagnet coil 61 operates in the same way as that of coil 62. As poise 5 approaches balancing position, travelling in the direction of the arrow in Fig. 6, beam 1 will tip slightly toward balance. The first movement in that direction will be the position shown in Fig. 7, above referred to. Here, as previously stated, the motor operates by short rapid impulses each moving the poise an extremely slight distance toward final balance, electromagnet of coil 61 having been cut out or deenergized at the instant that the full current was directed through coil 51, as previously explained with reference to coil 62 and Fig. 5. It is, therefore, not believed that detailed duplication or repetition, here, is necessary, as to Fig. 6. In the event of very slight over-run, that is automatically corrected in exactly the same way as previously described in connection with Fig. 5, but with the motor running reversely, of course.

The method and operation of the present invention have been detailed relatively to normal movements, including high speed travel of the poise to near-balanced position, and slow speed to exact balance from that point.

But, there may be excessive movement of the beam, such as would result from placing on the platter a weight considerably in excess of the extreme capacity of the scale to actually weigh, or the accidental lifting of the opposite end of the beam. In either case, the motor circuit would remain closed and would continue to drive the worm 9 until the poise became jammed against the respective beam end, in which case, the motor might burn out or other damage be done. Ample provision has been made to avoid this. As stated, at an earlier point, a dial and indicator have been provided to show the weight on the platter 28. With this mechanism is combined an automatic trip device for breaking the motor circuit in case of excessive over-run in either direction, as will hereinafter appear. One train of gearing for driving the indicator and including the above trip, includes a worm 24 on the power shaft 21 of the motor and in mesh with and driving a worm wheel 25 fixed to a shaft 100 journaled in a suitable bracket or other support 101, carried by a disc or plate 102, suitably supported by posts, standards or the like on the scale base 29. Shaft 100 is provided with a bevel gear 104 which meshes with and drives a gear 103 fixed to the lower end of a shaft 105, journaled in bracket 101 and extending upwardly through and beyond plate 102. Fixed to and revoluble with shaft 105, above plate 102, is a small pinion 106 which meshes with and drives a much larger diameter gear 107 journaled on a small stub shaft carried by plate 102. A gear 108 of greatly reduced diameter is carried by and revoluble with gear 107. It meshes with and drives gear 109 of much greater diameter and freely revoluble on shaft 105. To the hub of gear 109 is secured, to rotate therewith, the indicator pointer 26 adapted to travel over the calibrated dial or scale 27 which is suitably supported in any usual and well known manner above plate 102 and the parts thereon. These gears, pinions, worms and the worm shaft 9 are so proportioned that one complete rotation of gear 109, in either direction, corresponds to the extreme permissible travel of the poise 5 longitudinally of the worm shaft 9. So, starting at either end, operation of motor 23 to move poise 5 to the limit of its travel toward the other end, will, at the same time turn gear 109 through one complete rotation. The gear train described, obviously, constitutes a proportionate reduction.

It is a simple and efficient arrangement which may have many variations. Gear 109 is provided with a trip pin, peg, or the like 50 which, as it rotates, is adapted to engage and swing the pivoted circuit breaker arm 49 which is freely journaled on shaft 105 to permit rotation of the shaft without rotation of the arm and, likewise, to permit swinging of the arm about the shaft without rotation of the shaft. The free end of the circuit breaker arm 49 is disposed between two leaf spring contacts 42 and 44 carrying, respectively, contacts 43 and 45 which are adapted to engage, respectively, contacts 47 and 48 carried by a post of block 46. During the normal operation of the scale, when there is no excessive over-run, contacts 43 and 47, and 45 and 48, will be closed or operative so that the current may pass through them. In assembling, the gear 109 will be so disposed that pin 50 will lie very close to arm 49 but substantially one complete rotation therefrom relatively to the next following travel of the poise 5. Now, assume that the beam moves so that the poise 5 starts toward an excessive over-run; as soon as it has run the full permissible length of its travel, gear 109 will have completed one rotation, carrying pin 50 into engagement with arm 49 which will be swung against the respective spring contact 42 or 44, respectively, thereby separating the corresponding contacts and instantly breaking all circuits, so that the motor 23 is stopped and poise remains stationary. If the poise is travelling in the opposite direction and excessive over-run should start, the operation would be exactly the same, except that the pin 50 would be travelling reversely, would engage arm 49 from the opposite side, and would swing it to break the other set of contacts, again stopping the motor. Consequently, excessive over-run, in either direction is impossible. There is no need to illustrate the details of the calibrated scale dial, or the clock train reduction gears for rotating the pointer 26, further than has been done in Figs. 8 and 9, it is believed, as the same will be clearly understood.

Figure 1:
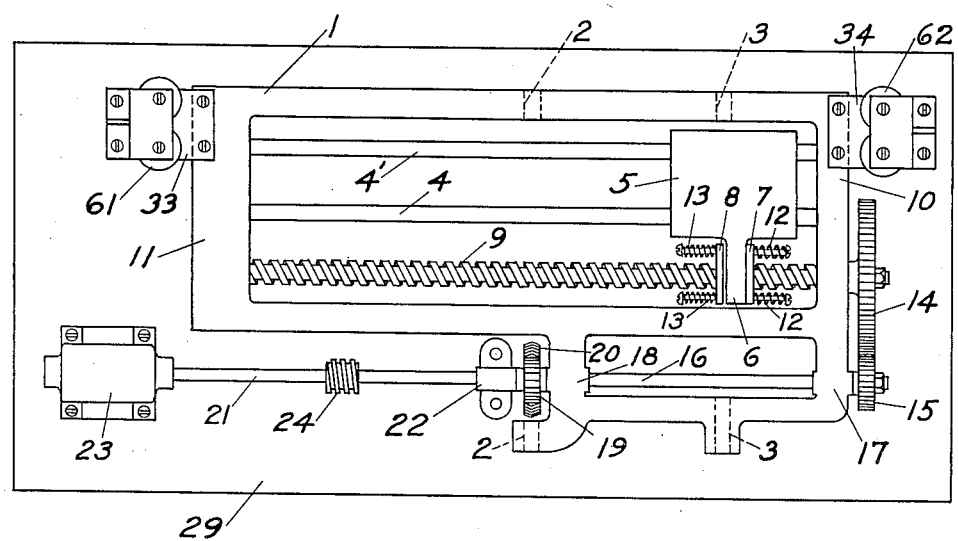
Fig. 1 is a top plan view of the type of scale selected, omitting platters, contacts, and indicating parts.

It will be understood that the core 54 of the trembling contact or interrupter may be variously proportioned to give the interrupter any desired corresponding characteristics. Similarly, the resistance through the winding 51 may be varied for the same reasons. In Fig. 1, the electro-magnets for creating the supplemental force cooperating with the poise are shown as arranged at and cooperating with opposite ends of the beam 1 and both, alternately, acting upwardly on the beam. Obviously they may be both arranged at the same end of the beam and acting oppositely on the beam—one up and one down. Likewise it is clear that they may be in positions other than at the ends. Again, their effective force may be varied within wide limits, in well known manner. While simple electro-magnets have been disclosed as very satisfactory and as easily possible of inclusion within the electrical system, other means acting to supplement the effective weight of the poise may be used. Springs, for instance may be used, or fluid dash-pots, with automatically actuated valves. The main consideration is the application of a supplemental force increasing the weight effect of the poise as it travels from the beam fulcrum or pivot 2 toward the balance position, and the discontinuance of such force as the poise closely approaches actual balancing position. In like manner, it will be well understood that the excessive over-run trip 50 as described, is but one of many practical devices applicable for obtaining the same result. An automatic trip for breaking the circuits could readily be actuated by the poise 5, itself, as it approached either end of its travel, or it could be similarly actuated by any one of the rotating or otherwise moving parts at the correct predetermined point.

The particular arrangements for making and breaking the circuits is purely illustrative. A great variety of arrangements may be found practical. The parts carried by the beam may be at any one of a large number of other locations and, similarly, the spring contacts may be placed entirely differently, nor do they actually need to be grouped as disclosed. Any means actuated by the movement of the beam to direct the flow of currents in the same paths is intended to be included within this application.

Clearly, too, the worm shaft 9 for reciprocating the poise may be substituted by other means suitable to that purpose.

Including changes and variations hereinbefore set forth, many changes may be made in the construction, arrangement and disposition of the various parts of the scale of this invention, all within the scope of the appended claims, without departing from the field of the invention, and it is meant to include all such within this application wherein only a single form of scale has been illustrated, purely as an example and in no degree intending to limit the application in any respect thereby.

It is believed that the operation, and use of the invention will be clear from the preceding detailed description.

Having thus described my invention, what I claim and desire to protect by letters patent is:

1. A scale comprising a beam, a poise carried by and traversible in said beam, an electric motor for traversing said poise, a plurality of circuits including and operating said motor, weight supplementing electro-magnets actuated by said circuits and acting magnetically upon the aforesaid beam to vary the weight effect of the poise, contacts actuated by said beam to break the circuits including said electro-magnets as the aforesaid poise approaches balancing position, and an electro-magnetically operated contact intermittently making and breaking the motor circuit from the time said beam breaks said circuits until equilibrium is established.

2. A scale comprising a beam, a poise carried by and traversible in said beam, an electric motor for traversing said poise, a plurality of circuits including and operating said motor, weight supplementing electro-magnets actuated by said circuits and acting magnetically upon the aforesaid beam to vary the weight effect of the poise, contacts actuated by said beam to break the circuits including said electro-magnets as the aforesaid poise approaches balancing position, and a trembling contact intermittently making and breaking the motor circuit from the time said beam breaks said circuits until equilibrium is established.

3. A scale comprising a beam, a poise carried by and traversible in said beam, means for traversing said poise at uniform speed to position approximately balancing, weight supplementing means cooperating with said poise throughout said traverse, automatically actuated means simultaneously discontinuing the cooperation of said supplementing means and the uniform speed traverse of said poise, and means for changing the traverse of said poise from uniform speed to intermittent speed from the point of said discontinuance to the point of equilibrium.

4. A scale comprising a beam, a poise carried by and traversible in said beam, an electric motor for traversing said poise, a plurality of circuits including and operating said motor, an electromagnetically actuated trembling contact in said motor circuits causing intermittent operation of said motor, weight supplementing electro-magnets actuated by some of said circuits and acting magnetically upon the aforesaid beam to vary the weight effect of said poise, contacts actuated by said beam to break the circuits including said electro-magnets as the poise approaches balancing position, a separate set of contacts actuated by said beam as the poise approaches balancing position and acting to direct flow of additional current through the aforesaid trembling contact from the time said circuit is broken until the poise reaches the point of balance.

5. A scale comprising a beam, a poise carried by and traversible in said beam, an electric motor for traversing said poise, a plurality of circuits including and operating said motor, weight supplementing electro-magnets actuated by said circuits and acting magnetically upon said beam to vary the weight effect of the poise, an electro-magnetic trembling contact included in one of the motor circuits, contacts actuated by said beam and simultaneously closing one each of the motor and weight circuits as the poise is traversed to a position approaching balance and breaking the weight circuit from the time said beam breaks said circuit until the poise reaches balance, the entire current of the weight circuit being automatically directed through the electro-magnet of the trembling contact in the motor circuit from the time said beam breaks said circuit until the poise reaches balance.

6. A scale comprising a beam, a poise carried by and traversible in said beam, an electric motor for traversing said poise alternately in opposite directions, a plurality of circuits including and operating said motor, weight supplementing electro-magnets actuated by said circuits and acting magnetically upon said beam to vary the weight effect of the poise, an electro-magnetic trembling contact included both in the motor circuit and in the circuit of the weight supplementing electro-magnet, and means automatically actuated by said beam for simultaneously closing the motor and weight circuits until the poise approaches balance and breaking the respective weight circuit from the time said beam breaks said circuits until the poise reaches balance and diverting the entire current of the weight circuit through the electro-magnet of the trembling contact in the motor circuit from the time said beam breaks said circuit until the poise reaches balance.

7. A scale comprising a beam, a poise carried by and traversible in said beam, an electric motor, for traversing said poise alternately in opposite directions, a plurality of circuits including and operating said motor continuously and uniformly, weight supplementing electro-magnets actuated by said circuits and acting magnetically upon said beam to vary the weight effect of the poise, an electro-magnetic trembling contact included in all said circuits, means automatically actuated by said beam for simultaneously closing each of said motor and weight supplementary electro-magnet circuits until the poise approaches balanced position and breaking the respective weight circuits at the time the poise approaches balanced position, diverting the entire current of the respective supplementary electro-magnet weight circuit through the electro-magnet during the traverse of the poise from the time the weight circuit is broken until balanced position is reached.

8. A scale comprising a beam, a poise carried by and traversible in said beam, an electric motor for traversing said poise, a plurality of circuits including and operating said motor continuously and uniformly, weight supplementing electro-magnets included in and actuated by said circuits, a trembling contact included in said circuits and operable to change said circuits from uniform to intermittent, means carried by said beam for maintaining one of said motor circuits closed and traversing said poise rapidly and uniformly to approximate balance, and means carried by said beam for automatically changing said circuit from rapid uniform to slow intermittent during traverse from approximate balance to balance.

PERRY OKEY.